US012639537B2

(12) United States Patent
Young et al.

(10) Patent No.: US 12,639,537 B2
(45) Date of Patent: *May 26, 2026

(54) DETECTION METHOD FOR PASSIVE IDENTIFICATION TAGS

(71) Applicant: Pascal Tags Inc., Louisville, KY (US)

(72) Inventors: Brandon Thomas Young, Louisville, KY (US); Robert Rudolf Rotzoll, Cascade, CO (US)

(73) Assignee: Pascal Tags Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/978,959

(22) Filed: Dec. 12, 2024

(65) Prior Publication Data

US 2025/0111179 A1     Apr. 3, 2025

Related U.S. Application Data

(63) Continuation of application No. 18/288,969, filed as application No. PCT/US2022/027166 on Apr. 30, 2022, now Pat. No. 12,217,120.

(60) Provisional application No. 63/182,027, filed on Apr. 30, 2021.

(51) Int. Cl.
*G06K 7/10*          (2006.01)
(52) U.S. Cl.
CPC ................................ *G06K 7/10366* (2013.01)
(58) Field of Classification Search
USPC ........................................................ 235/451
See application file for complete search history.

(56) References Cited

U.S. PATENT DOCUMENTS

| | | | | |
|---|---|---|---|---|
| 10,970,991 | B1* | 4/2021 | Alovert | ................. G08B 21/20 |
| 2008/0024277 | A1* | 1/2008 | Volpi | ................... G01S 13/878 |
| | | | | 340/10.1 |
| 2009/0160647 | A1* | 6/2009 | Oshima | ............. G08B 21/0275 |
| | | | | 340/572.1 |
| 2010/0328073 | A1* | 12/2010 | Nikitin | ................. G06K 7/0008 |
| | | | | 340/572.1 |
| 2013/0201006 | A1* | 8/2013 | Kummetz | .......... G06K 7/10019 |
| | | | | 340/10.1 |
| 2015/0199602 | A1* | 7/2015 | Van Der Weide | .......................... |
| | | | | G06K 7/10366 |
| | | | | 235/492 |
| 2021/0073488 | A1* | 3/2021 | Turner | ............. G06K 19/07766 |

(Continued)

*Primary Examiner* — Allyson N Trail
(74) *Attorney, Agent, or Firm* — Run8 Patent Group, LLC; Peter Miller; Marissa Kohrman

(57) ABSTRACT

System, device, and method for detecting a passive identification tag and identifying a tag ID for the passive identification tag are provided. The system can include a transmitting system, a passive identification tag, and a receiving system. The transmitting system generates one or more detection signals to interrogate the passive identification tag, where the one or more detection signals includes a first detection signal having a first frequency range. The passive identification tag receives the one or more detection signals, and generates at least a first tag response in response to the first detection signal. The receiving system receives the first tag response, and processes the first tag response to determine a plurality of signal components for the first frequency range, where the plurality of signal components can be used to determine the tag ID.

20 Claims, 12 Drawing Sheets

100

(56) References Cited

U.S. PATENT DOCUMENTS

| 2024/0219889 A1* | 7/2024 | Young | G06K 19/0675 |
| 2024/0220746 A1* | 7/2024 | Young | G06K 7/10158 |

* cited by examiner

200

TRANSMITTING A DETECTION SIGNAL TO A PASSIVE TAG 901

RECEIVING A RESPONSE SIGNAL FROM THE PASSIVE TAG 903

TRANSFORMING THE RESPONSE SIGNAL TO GENERATE VALUES FOR A PLURALITY OF VARIABLES 905

DETERMINING A TAGE ID BASED ON THE VALUES FOR THE PLURALITY OF VARIABLES 907

900

DETECTION METHOD FOR PASSIVE IDENTIFICATION TAGS

CROSS-REFERENCE TO RELATED APPLICATIONS

This Application is a continuation of U.S. application Ser. No. 18/288,969, filed on 30 Oct. 2023, which is a 371 application of PCT/US2022/027166, filed on 30 Apr. 2022, which claims the benefit of U.S. Provisional Application No. 63/182,027, filed on Apr. 30, 2021, each of which is incorporated in its entirety by this reference.

STATEMENT OF GOVERNMENT INTEREST

This invention was made with government support under Contract No.: 1940248 awarded by the National Science Foundation. The government has certain rights in the invention.

TECHNICAL FIELD

The present disclosure relates generally to tags and, more particularly, relates to systems, devices and methods for detecting passive identification tags.

BACKGROUND

Tags are often used to identify and track objects or individuals. A tag can be an active identification tag or a passive identification tag, where the active identification tag often includes more electrical components including antenna, chip, sensors and internal battery, to provide richer information and a longer read range. However, due to its larger size and higher complexity to accommodate the electrical components, the active identification tag is often expensive to design and fabricate. The higher expense and larger size can make an active identification tag less attractive for applications in, for example, inventory management and item tracking, when compared to a passive identification tag that comes in a smaller size and requires no internal battery and, in some cases, no chip or antenna. However, while being cost-effective and with ease for adhering to products, existing passive identification tags are considered to deliver less amount of information and less data than active identification tags.

SUMMARY

Passive identification tags are widely used for applications in inventory and supply chain management, due to their low cost and ease of manufacturing. A passive identification tag can be chip-based or chipless as long as it doesn't have a battery. Unlike chip-based passive identification tags that typically include an application-specific integrated circuit (ASIC) to encode information, such as ID, environmental data of the tag and others, and an antenna to supply power and transmit detection signals to the ASIC, a chipless passive identification tag further reduces the size, weight, and cost of tags by requiring no chip and/or no antenna.

Implementations disclosed herein relate to systems, devices and methods for detecting tags and, in particular, passive identification tags. These systems, devices, and methods adapt detection signals to induce tag responses from passive identification tags, such as chipless passive identification tags, where the tag responses can be decomposed to determine one or more signal components, based on which, tag identifications (IDs) for each of the passive identification tags are determined.

In various implementations, a detection signal can be a radio frequency (RF) signal having a frequency range, where the RF signal can be continuous or discrete. The detection signal can have a frequency that varies as a function of time within the frequency range, and can be generated and transmitted by one or more transmitters interrogating the passive identification tags.

For example, a reader device can have one transmitter that generates a detection signal, where the detection signal is transmitted to a passive identification tag at an incident angle (which can be within the range of approximately 0 degree and 180 degree). In response to receiving the detection signal, the passive identification tag can generate a tag response, where the tag response can be received by a receiver at a receiving angle. The receiver that receives the tag response can be included in the reader device, or can be independent of the reader device. The receiver can include a processor, or otherwise be coupled to a processor locally or remotely via one or more networks, where the processor can process, under instructions of a tag identification logic that are stored in a memory to which the processor is coupled, the tag response to determine a plurality of signal components. The plurality of signal components can include, for example, vector elements that include a real component of the tag response and an imaginary component of the tag response. The real and imaginary components of the tag response can be stored, for example, in a vector (e.g., multidimensional vector). The plurality of signal components can further include scalar elements, including: one or more amplitude or magnitude components (e.g., real amplitude component and/or imaginary amplitude component), a phase component, a group delay component, a phase delay component, and/or other components not specified herein. It's noted that the magnitude/amplitude component, the phase component, the group delay component, and the phase delay component may be derived from the real component and the imaginary component. Such signal components can each vary as a function of frequency and/or time, and can be normalized for further processing to determine a tag ID of the passive identification tag. The normalization here may ensure that tag IDs for different passive identification tags can be used for the same inventory system.

In some implementations, two or more signal components (e.g., the real amplitude component, the phase component, the phase delay component) can be selected from the plurality of signal components, and for each of the two or more signal components, a characteristic value can be obtained to compute the tag ID. For example, the characteristic values of the two or more signal components can be added to obtain a sum, and the sum can be applied as an input to a hash function that converts the sum into the tag ID that is a combination of numerals and characters. In some implementations, the characteristic values can be processed to obtain the tag ID using other algorithms, including but not limited to: subtraction, integration, derivation, multiple, division, or any combination thereof.

Due to the environment (e.g., moisture, dust) in which the passive identification tag is situated, the passive identification tag may be degraded or covered with a layer of dust that affects the accurate detection of the tag response generated by the passive identification tag upon receiving the detection signal. In these cases, parameters of the detection signal can be tuned to improve the accuracy in detecting the tag response. For example, the power of the detection signal, the incidence angle of the detection signal, the polarization of the detection signal, or the frequency range of the detection signal can be adjusted for enhancing the tag response, to be detected by the receiver, so that the tag ID can be determined.

As another example, the reader device can have more than one transmitter, e.g., three transmitters configured at different locations, each generating a detection signal. In this example, the three detection signals are respectively transmitted to the passive identification tag at a corresponding incident angle (e.g., 0°, +60°, −60°). For each of the three detection signals, the passive identification tag can responsively generate a tag response, where such tag responses can be transmitted to a receiver to determine the plurality of signal components, from which one or more signal components can be selected to determine the tag ID for the passive identification tag, using one or more tag ID formulation rules. The one or more tag ID formulation rules may define the computing algorithm of determining a characteristic value for each of the aforementioned signal components. Optionally or additionally, the one or more tag ID formulation rules may further define the total number of signal components and the selection of signal components for computing the tag ID. Optionally or additionally, the one or more tag ID formulation rules may further define the computing algorithm for the tag ID based on the characteristic values of the selected signal components.

Alternatively, when a reader device uses one transmitter to generate and transmit a detection signal, the correspondingly generated tag response from the passive identification tag can be received by more than one receiver configured at different locations. For example, the more than one receiver can include two receivers: one positioned along an axis of the passive identification tag and the other positioned off the axis of the passive identification tag. In this example, the receiver positioned along the axis of the passive identification tag can receive an axial component of the tag response that is generated by the passive identification tag in response to the detection signal, and the receiver positioned off the axis of the passive identification tag can receive an angular component (can also referred to as "non-axial component") of the tag response that is generated by the passive identification tag in response to the detection signal. The axial component of the tag response can be used to compute the tag ID for the passive identification tag, or the difference between the axial and non-axial components of the tag response can be used to compute the tag ID. Optionally, the computed tag ID can be visually displayed to a user via a display unit to which the processor is coupled, or a message confirming the validity of the tag ID can be delivered to the user either visually or audibly.

Implementations disclosed herein can be applied to a passive identification tag having a layered structure. For example, the passive identification tag can have a layered structure including a substrate and a resonance layer (e.g., frequency selective surface, "FSS") formed on the substrate. The resonance layer can include a resonant structure that generates a tag response upon receiving the detection signal, where the resonant structure can include one or more resonant sub-structures (also referred to as "resonators"). The one or more resonant sub-structures can be, for example, a plurality of concentric square loops made of copper. As another example, the one or more resonant sub-structures can be a rectangular loop having a gap in one of its four sides. As a further example, the one or more resonant sub-structures can be a rectangular loop have a gap in two or more of its four sides, respectively. The resonant structure is not limited to the configuration of the one or more resonant sub-structures described herein, and can have other shapes such as U-shape, hexagonal, etc. The resonant structure can be made of conductive or metallic material(s), such as copper, silver, aluminum, graphene, carbon black, graphite, or other materials. The tag response can be generated based on the material and geometric dimensions (e.g., shape, thickness, location, orientation), and/or other parameters, of the resonant structure.

Optionally, the layered structure of the passive identification tag can further include a dielectric layer formed on the substrate and/or over the resonance layer, to modify the tag response generated by the resonant layer of the passive identification tag upon receiving the detection signal. In this case, the dielectric layer and the resonant layer may together generate a modified tag response that is different from the tag response generated by the resonant layer. The dielectric layer can include a dielectric structure that selectively covers one or more portions of a top surface of the resonance layer, where the one or more portions of the top surface of the resonance layer can be continuous or discrete. As another non-limiting example, the resonant layer may include one or more resonant sub-structures that are disconnected with each other, and in this case, the dielectric structure can include a dielectric sub-structure disposed in-between two resonant sub-structures of the one or more resonant sub-structure. In this example, the dielectric sub-structure disposed in-between the two resonant sub-structures may or may not be in touch with the two resonant sub-structures. In some implementations, the tag response can be modified based on the material and geometric dimensions (e.g., shape, thickness, location, orientation), and/or other parameters of the dielectric structure. In some implementations, the dielectric layer can include the dielectric structure, a conductive structure, and/or a semiconductor structure, disposed on the substrate and/or over the resonance layer.

At least one aspect of the disclosure is directed to a system for identifying a passive identification tag. The system includes: a transmitting system, the passive identification tag, and a receiving system. The transmitting system generates one or more detection signals to interrogate the passive identification tag, where the one or more detection signals can include a first detection signal having a first frequency range. The passive identification tag receives the one or more detection signals, and generates one or more tag responses in response to receiving the one or more tag responses, where the one or more tag responses includes a first tag response corresponding to the first detection signal. The first tag response can be processed to determine a plurality of signal components for the first frequency range, and characteristic values (if applicable) are determined for one or more of the plurality of signal components and are stored in a multidimensional vector. The receiving system receives the one or more tag responses including the first tag response. For example, the receiving system processes the first tag response to: determine a plurality of signal components of the first tag response for the first frequency range, determine characteristic values for one or more of the plurality of signal components, and determine a tag identification (ID) based on the characteristic values for the one or more of the plurality of signal components. The transmitting system and the receiving system can be configured to form a transceiving system, such as a reader device.

Exemplary optional features of the system may be as follows. Optionally, the plurality of signal components can include a real amplitude component of the first tag response, an imaginary amplitude of the first tag response, a phase of the first tag response, a group delay of the first tag response, a phase delay of the first tag response, and/or other signal components. Optionally, when the first tag response is too weak to detect, the transmitting system generates an updated first detection signal by modifying: the first frequency range, power, incident angle, polarization, and/or phase of the first detection signal. Optionally, the transmitting system includes a plurality of transmitters at different locations to generate the one or more detection signals so that the one or more detection signals have different incident angles with respect to the passive identification tag. The plurality of transmitters can include a first transmitter positioned to align with an axis of the passive identification tag to transmit the first detection signal to the passive identification tag along a first incident direction, and a second transmitter positioned off the axis of the passive identification tag to transmit a second detection signal to the passive identification tag along a second incident direction different from the first incident direction.

Optionally, the receiving system can include a plurality of receivers positioned to receive the one or more tag responses from the passive identification tag. The plurality of receivers can include: a first receiver positioned to align with an axis of the passive identification tag to receive an axial component of the first tag response, and a second receiver positioned off the axis of the passive identification tag to receive an non-axial component of the first tag response. The axial and non-axial components of the first tag response may be processed to determine the tag ID. Optionally, when the transmitting system and the receiving system are combined to form the transceiving system, and the transceiving system includes a transceiver that generates the one or more detection signals and receives the one or more tag responses.

Optionally, the characteristic values for one or more of the plurality of signal components are processed using a computational algorithm (e.g., sum with or without weighted factors) to determine a final numeric value, where the final numeric value is applied as input to a hash function to generate an output, and the output of the hash function is used (or slightly modified for use) as the tag ID. Optionally, the passive identification tag includes a layered structure having a substrate, a resonance layer disposed on the substrate, and/or a dielectric layer disposed on the resonance layer, and wherein the first tag response depends on material(s) of the layer structure and geometrical dimensions of the layered structure.

Another aspect is directed to a method for identifying a passive identification tag, the method can include: generating, by one or more transmitters, one or more detection signals to a tag; transmitting, by the one or more transmitters, the one or more detection signals to the tag, where the one or more detection signals includes a first detection signal having a first frequency range; generating, by the tag, one or more tag responses in response to receiving the one or more detection signals from the one or more transmitters, where generating the one or more tag responses includes generating a first tag response in response to receiving the first detection signal; and radiating, by the tag, the one or more tag responses, where the radiating includes radiating the first tag response to a first receiver. The method can further include: processing, by the first receiver or a processor coupled to the first receiver, the first tag response to determine a plurality of signal components of the first tag response for the first frequency range; and determining whether characteristic values can be calculated for one or more of the plurality of signal components of the first tag response. The method can further include: in response to determining that the characteristic values can be calculated, storing the characteristic values in a multidimensional vector for storage in a database; and determining a tag identification (ID) using the multidimensional vector.

Exemplary optional features of the system may be as follows. Optionally, determining the tag ID using the multidimensional vector comprises: retrieving the multidimensional vector from the database; processing the characteristic values in the multidimensional vector using a computational algorithm to determine a final value; applying the final value as input to a hash function to determine an output of the hash function; and determining the tag ID based on the output of the hash function.

Optionally, when the first tag response is too weak to detect so that the characteristic values for one or more of the plurality of signal components cannot be determined, the method further comprises: modifying the first detection signal by changing the first frequency range, power, incident angle, polarization, and/or phase of the first detection signal, so that an updated first tag response is generated for the modified first detection signal; using the updated first tag response to determine a plurality of updated signal components; and determining the tag ID using one or more of the plurality of updated signal components.

Optionally, the plurality of signal components of the first tag response include: a real component of the first tag response, an imaginary component of the first tag response, an amplitude component of the first tag response, a phase component of the first tag response, a group delay component of the first tag response, a phase delay component of the first tag response, and/or other signal components not specified herein. The real and imaginary components can be stored or represented using a vector. The one or more amplitude components, the phase component, the group delay component, and the phase delay component can be scalar elements respectively derived from the real and imaginary components. The one or more amplitude components can include a real amplitude component and/or an imaginary amplitude component.

Optionally, the one or more transmitters are positioned at different locations to generate the one or more detection signals, and the one or more detection signals have different incident angles with respect to the tag. Optionally, the one or more transmitters comprises: a first transmitter positioned to align with an axis of the tag to transmit the first detection signal to the tag at a first incident angle, and a second transmitter positioned off the axis of the tag to transmit a second detection signal to the tag at a second incident angle different from the first incident angle.

Optionally, the first tag response is also received by a second receiver different from the first receiver, where the first receiver is positioned to align with an axis of the tag to receive an axial component of the first tag response and the second receiver is positioned off the axis of the passive identification tag to receive a non-axial component of the first tag response. The axial and non-axial components of the first tag response can be applied to determine the tag ID of the tag. Optionally, processing the first tag response includes removing noise signals from the first tag response.

Another aspect is directed to a method for identifying a tag, where the method comprises: generating, by a transceiver, one or more detection signals; transmitting, by the transceiver, the one or more detection signals to the tag, wherein the one or more detection signals include a first detection signal having a first frequency range; generating, by the tag, one or more tag responses in response to receiving the one or more detection signals from the transceiver, where generating the one or more tag responses includes generating a first tag response in response to receiving the first detection signal; radiating, by the tag, the one or more tag responses, where the radiating includes radiating the first tag response to the transceiver; processing, by one or more processors coupled to the transceiver, the first tag response to determine a plurality of signal components of the first tag response for the first frequency range; determining whether characteristic values can be calculated for one or more of the plurality of signal components of the first tag response; in response to determining that the characteristic values can be calculated: storing the characteristic values in a multidimensional vector for storage in a database; and determining a tag identification (ID) using the multidimensional vector. The individual features and/or combinations of features defined above in accordance with any aspect of the present invention or below in relation to any specific embodiment of the invention may be utilized, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION

Figure 1:
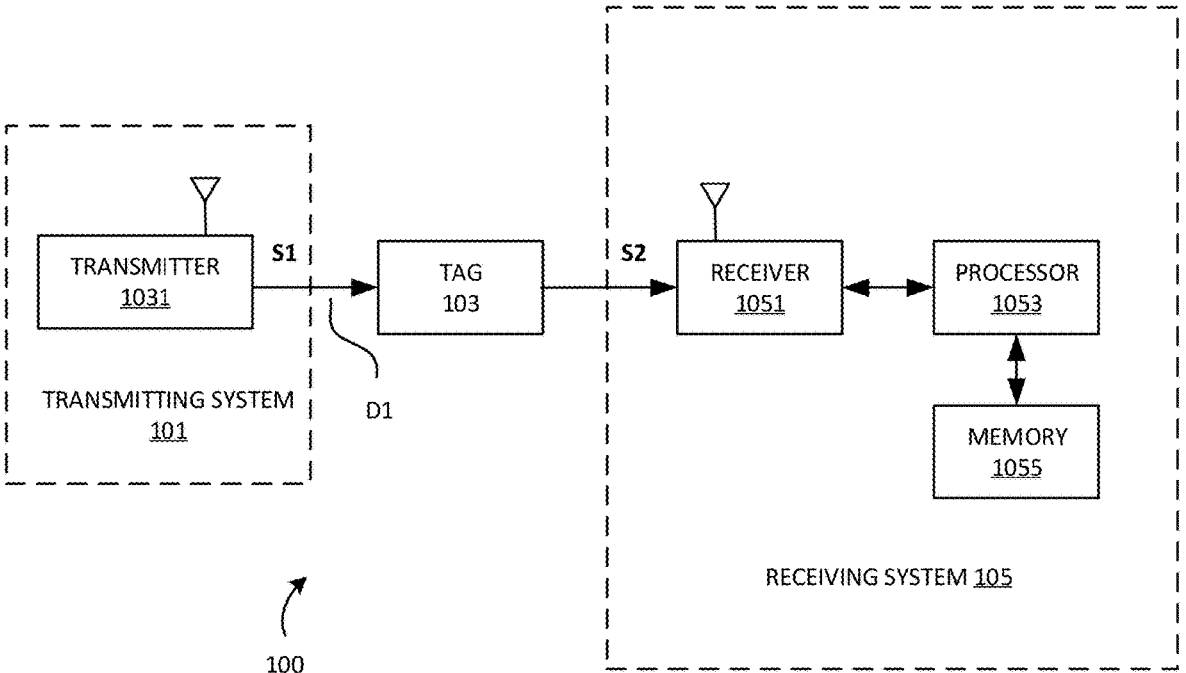
FIG. 1 illustrates a first example system for detecting a passive identification tag for practicing certain aspects of the present disclosure, according to one or more embodiments described herein.

Implementations disclosed herein aim to address one or more issues existing in present identification tags, which have two major categories: active identification tags and passive identification tags. A typical active identification tag includes a substrate, an antenna disposed over the substrate, and an integrated circuit chip coupled to the antenna, for encoding information (e.g., identification information). The active identification tag can further include an internal battery (or other power source), one or more sensors, and/or a transmitter, in addition to the substrate, the antenna, and the integrated circuit chip. The internal battery can be used to power the integrated circuit chip, to increase the strength of a signal transmitted by the active identification tag so that such signal can be transmitted over a greater distance than using passive identification tags. The one or more sensors may be used to measure and/or record parameters such as pressure, temperature, and humidity. However, due to the use and complexity of components such as integrated circuit chip and the internal battery, the active identification tag is relatively expensive to design and produce and often has a noticeable volume/size that limits its application where durable, light and inexpensive tags are desired.

Compared to active identification tags, passive identification tags are often more used for applications in inventory and supply-chain management as well as in other fields (e.g., item tracking and passports), due to their lower cost, durability, and lighter weight. A typical passive identification tag can be a passive radio frequency identification (RFID) tag and includes a substrate, an antenna disposed over the substrate, and a chip coupled to the antenna. The substrate can be made of paper or cloth, and be attached to a surface of an object or product, such as a box or t-shirt. The antenna can receive a signal from a transmitter, and transfer the signal to the chip. The antenna can be of any type, such as dipole, loop, slot, coil, or a combination thereof. The chip can derive power from the signal radiated by the transmitter, since the passive identification tag does not include a battery or other power source.

To further reduce the size, weight, and cost of tags, the passive identification tag can be designed and manufactured requiring no chip and/or no antenna. Still, a passive identification tag (e.g., a chipless passive identification tag) is considered by users to provide less amount of information than an active identification tag. Accordingly, a system, devices, and method for detecting passive identification tags are provided, where responses from passive identification tags (e.g., the chipless passive identification tag) can be collected and analyzed in the form of information-rich multidimensional vectors, to accurately and effectively differentiate one passive identification tag from another. Implementations disclosed herein relate to systems, devices and methods for detecting such passive identification tags, and other applicable tags as well.

In some implementations, one or more transmitters generate and transmit one or more detection signals to a tag, and the tag can generate and radiate one or more tag responses to one or more receivers, upon receiving the one or more detection signals. In some implementations, the one or more detection signals can include a first detection signal having a first frequency range, and the one or more tag responses can include a first tag response in response to receiving the first detection signal. In some implementations, one or more processors can, under instructions from a tag identification logic stored in the memory accessible by the one or more processors, analyze or decompose the first tag response to determine a plurality of signal components of the first tag response that has the first frequency range. One or more computing algorithms may be applied to determine characteristic values for one or more of the signal components. In some implementations, the characteristic values can be a numerical value, and can be stored in a multidimensional vector for determining a tag identification (ID). These implementations are not intended to be limiting, and detailed descriptions of these and additional implementations are provided hereinafter.

FIG. 1 illustrates an example system 100 for detecting a passive identification tag. As shown in FIG. 1, the system 100 can include a transmitting system 101, a tag 103 (e.g., a passive identification tag), and a receiving system 105. The transmitting system 101 can include a transmitter ("Tx") 1031 that transmits a detection signal S1 to the tag 103 over a certain distance. In some implementations, the detection signal S1 can be a radio frequency (RF) signal, such as a wifi or 5G signal. For example, when the tag 103 is a RFID tag, the detection signal S1 can be a wireless RF signal, to be transmitted to the tag 103. In this case, the transmitter 1031 is a RF transmitter, tunable with respect to the power, incident angle (i.e., incident direction), polarization, phase, and frequency of the detection signal S1 emitted by the RF transmitter towards the tag 103. This may help improve detection accuracy by removing noise and battling against abnormal tag conditions such as tag degradation, and the power of the detection signal S1, the frequency of the detection signal S1, the incident direction of the detection signal S1, the phase of the detection signal S1, and/or the polarization of the detection signal S1 can be tuned, depending on the configuration and conditions of the tag 103. In some implementations, the detection signal S1 can be a signal with its frequency varied in time. The detection signal S1 can be configured to be continuous or discrete.

In some implementations, the transmitting system 101 can include a plurality of transmitters 1031 each transmits a detection signal to the tag 103 over a range of distances, so that a plurality of tag responses are generated each responsive to a detection signal generated by a respective transmitter 1031. In some other implementations, the transmitting system 101 can include one transmitter 1031 that generates a plurality of detection signals to interrogate the tag 103 so that a plurality of tag responses are generated in response to the plurality of detection signals, where the plurality of detection signals can have different power, incident angle, phase, polarization, or frequency.

The tag 103 can be a passive identification tag having a resonant structure, and optionally, can have one or more antennas coupled to the resonant structure. The resonance structure can be made of a metallic material or other conductive materials. As a non-limiting example, the resonance structure can be a frequency-selective surface (FSS) disposed on a substrate. Optionally, the tag 103 can further include a dielectric structure (or a semi-conductor structure, or a conductive structure), where the resonant structure is disposed on a substrate, and the dielectric structure is disposed over the substrate with respect to the resonant structure, to modify the tag response generated by the resonant structure in response to the receiving of the detection signal S1. The tag 103 having such resonant structure and/or the dielectric structure can be referred to as a material adjusted signature tag ("MAST").

In some implementations, the resonant structure can be a layered structure. For example, the resonant structure can include a plurality of FSSs with a bottom layer of FSS being disposed on a substrate. In this example, a dielectric layer can be respectively sandwiched between every two adjacent FSSs. Optionally or additionally, the tag 103 can further include a reference layer configured to receive the detection signal S1 and in response, transmit a reference signal (see, e.g., signal 505 in FIG. 5B) to the receiving system 105, along with the tag response generated by the resonant structure in response to receiving the detection signal S1. In some implementations, the reference signal generated by the reference layer can be applied to, before any analysis of the tag response, determine whether a tag response is detected, and if the tag response is determined to be detected, the reference signal can be further applied to normalize the detected tag response. In some implementations, to detect the reference signal, the angle, power, polarization, and/or frequency of the detection signal S1 can be varied, and once the reference signal is detected, the corresponding detection signal S1 can be applied to interrogate each passive identification tag having the reference layer. The reference layer can include a reference structure (made of a conductive material) that remains the same across different tags, to allow the normalizing of different tag responses generated by the different tags, thereby achieving quicker and reliable tag detection and analysis.

As a non-limiting example, the reference structure can be disposed on the substrate, along with but isolated from the resonant structure.

Referring to FIG. 1, when the transmitter 1031 transmits the detection signal S1 via an antenna to the tag 103, the tag 103 can generate a tag response S2 in response to the detection signal S1, where the tag response S2 can be transmitted and received by the receiving system 105. In some implementations, the tag response S2 can be a signal (e.g., RF signal) with its frequency varying as a function of time. In some implementations, the tag response S2 can be processed to generate an information-rich, multidimensional vector that stores a plurality of signal components of the tag response S2, where the plurality of signal components can include a real amplitude component, an imaginary amplitude component, a phase component, a group-delay component, and a phase-delay component. The plurality of signal components may be further processed to generate identification (or tracking) information that differentiates the tag 103 from other tags, thereby identifying (or tracking) the object to which the tag 103 is attached. Relevant descriptions of the configuration and utilization of the multidimensional vector will be provided later with more details.

The receiving system 105 can include a receiver ("Rx") 1051, a processor 1053 electrically coupled to the receiver 1051, and a memory 1055 which is locally or remotely accessible by the processor 1053. The receiving system 105 can further include a power supply (not shown in FIG. 1), one or more input devices (e.g., a microphone or camera, not shown in FIG. 1), and one or more output devices (e.g., a display or speaker, not shown in FIG. 1). The receiver 1051 can be a reader device that uses an antenna to receive the aforementioned tag response S2 transmitted from the tag 103. The processor 1053 can execute a tag identification logic stored in the memory 1055, to process the tag response S2 to compute characteristic values for the plurality of signal components, where the characteristic values can be stored in the format of a multidimensional vector. The characteristic values for the plurality of signal components can be utilized to determine a tag identification number ("tag ID"), for example, by applying the characteristic values for the plurality of signal components as input to the tag identification logic to generate the tag ID. The tag ID can be stored in a database or ledger, in association with the tag 103 or the product to which the tag 103 is attached.

Optionally, the tag 103 may be covered with a thick layer of dust or is partially covered with dirt, resulting in the originally generated tag response S2 being too weak to provide characteristic values for one or more of the signal components. In this case, the transmitter 1031 can transmit an updated detection signal (e.g., having increased power or different polarization with respect to the detection signal S1) to the tag 103, and the receiver 1051 may receive an updated tag response that is able to provide characteristic values for the plurality of the signal components, for determining the tag ID.

To address the noise issue and battling against abnormal tag conditions such as tag degradation, the transmitter 1031 can be programmed, or manually configured to have different powers, incident angles, polarization, phases, and frequencies for the detection signal S1 emitted by the transmitter 1031. For example, the transmitter 1031 can have a first mode (e.g., a button controllable by a user) to adjust or switch the amplitude (i.e., power) of the detection signal S1 between a plurality of pre-defined power levels. The transmitter 1031 can have a second mode to adjust the incident angle of the detection signal S1 with respect to the tag 103, for example, the transmitter 1031 may define a plurality of predefined positions, and issue a confirmation signal/sound each time the transmitter 1031 is placed in one of the plurality of predefined positions that provide a respective incident angle with respect to the tag 103. The incident angle can be selected depending on the material forming the tag 103 and/or the layered structure of the tag 103. The transmitter 1031 can have a third mode to adjust the polarization of the detection signal S1, where the third mode can provide a plurality of pre-defined polarizations for the detection signal S1 or provide continuous change in the polarization. The transmitter 1031 can have a fourth mode to adjust the phase of the detection signal S1. The transmitter 1031 can have a fifth mode to adjust the frequency range of the detection signal S1. Optionally, the detection signal S1 can be, instead of manual selection by a user via the different modes, programmed based on the tag 103 and the user's needs. Optionally, when the transmitter 1031 is set in a particular mode for transmitting a particular detection signal, other transmitters within a certain range may receive an alert signal and be set in the particular mode for transmitting the particular detection signal.

The tag ID can be utilized to identify the tag 103 (for example, in accordance with a classification scheme), and the receiving system 105 can use the tag ID to store relevant information of the product to which the tag 103 is attached. The relevant information can include, for example, sensor data (if there is any) indicating the environment (e.g., humidity and temperature) of the product, the time (e.g., production date, receiving date, shipping date), the location of the product, and the product information (e.g., quantity of items in a single package, the category of the product, the manufacturer or distributor), for storage in a database or ledger. In some implementations, the tag ID can include one or more integers, one or more letters, and/or one or more symbols. For example, the tag identification logic can compute the tag ID using a function, where the characteristic values of the plurality of signal components stored in the multidimensional vector are applied as input to the function or set of functions to generate a combination of numbers and letters as the tag ID that may or may not adhere to UPC (Universal Product Code) or other existing data formats. Optionally, prior to being applied as input to the hash function (or other computing function), the characteristic values of the plurality of signal components may be respectively normalized and undergo a calculation function to obtain a numerical value, and the numerical value (e.g., a sum of the normalized characteristic values) is applied as input to a hash function to generate the tag ID.

Optionally, prior to determining the characteristic values for the plurality of signal components, the processor 1053 can, under instructions (e.g., the tag identification logic) stored in the memory 1055, execute a transform function to remove noise from the tag response S2. Optionally, the transmitter 1031 can be included in the receiving system 105, so that the receiver 1051 becomes a transceiver. Optionally, the receiver 1051 is a RF receiver that receives the tag response S2, or a RF transceiver that both induces and detects the tag response S2 (or a plurality of tag responses).

Figure 2:
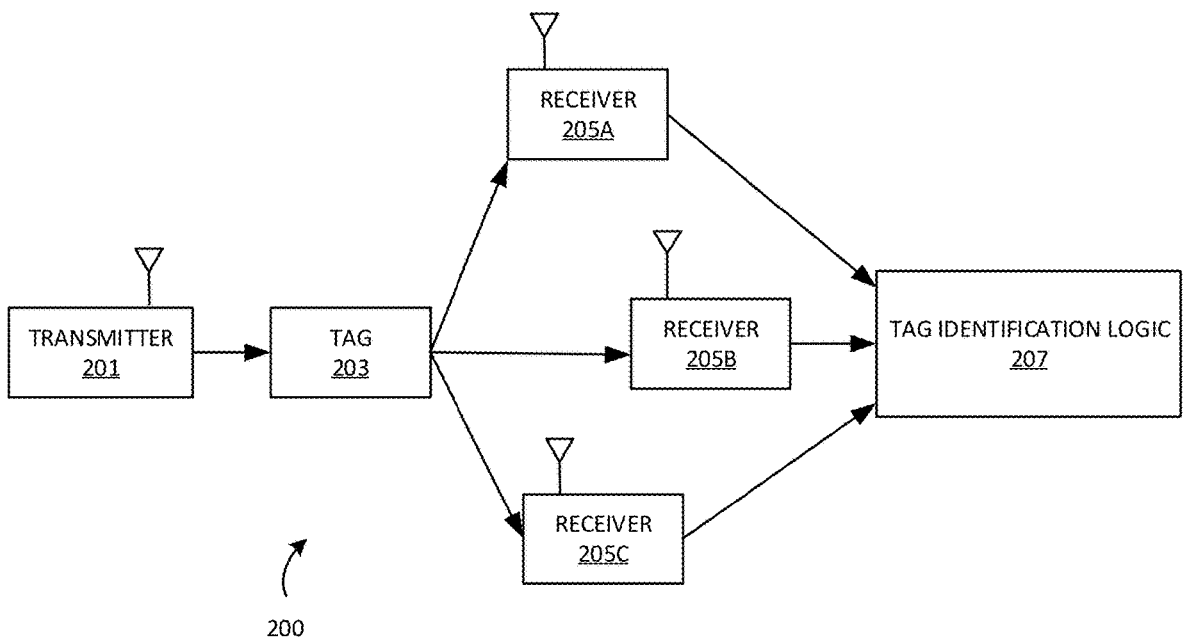
FIG. 2 illustrates a second example system for detecting a passive identification tag for practicing certain aspects of the present disclosure, according to one or more embodiments described herein.

FIG. 2 illustrates another example system 200 for detecting a passive identification tag for practicing certain aspects of the present disclosure, in accordance with various implementations. As shown in FIG. 2, the system 200 can include a transmitter 201, a tag 203 responsive to one or more detection signals generated by the transmitter 201, a plurality of receivers that receive one or more tag responses from the tag 203 that are generated responsive to the one or more detection signals, and a tag identification logic 207 that includes instructions to process the one or more tag responses received from the plurality of receivers. The plurality of receivers may for example include a first receiver 205A at a first receiving location, a second receiver 205B at a second receiving location different from the first receiving location, and a third receiver 205C at a third receiving location different from the first and second receiving locations. The first receiver 205A, the second receiver 205B, and the third receiver 205C may be included in a single device and have fixed relative positions with each other.

In some implementations, the tag 203 may be configured to generate a tag response with maximum amplitude (or a particular amplitude) responsive to a detection signal transmitted from the transmitter 201 in a particular direction that aligns with a particular axis (e.g., an orientation of the layered structure in the tag 203) of the tag 203. For example, as shown in FIG. 2, the transmitter 201 may emit a detection signal towards the tag 203 in a first direction D1 that aligns with a first axis of the tag 203, and responsive to the detection signal, the tag 203 generates a tag response with a maximum signal amplitude. In this example, the first receiver 205A positioned off the first direction receives the tag response at a first angle relative to the axis of the tag 203, the second receiver 205B positioned along (or slightly off) the first direction receives the tag response at a second angle (i.e., approximately 0 degree) with respect to the axis of the tag 203 where the second angle is different from the first angle, and the third receiver 205C positioned off the first direction receives the tag response at a third angle with respect to the axis of the tag 203 where the third angle is different from the first and second angles.

In this example, because the second receiver 205B is positioned along the first direction that aligns with the first axis of the tag 203 to receive the tag response, the tag response received at the second receiver may be referred to as "axial component of the tag response" and the tag response received at the first receiver 205A or third receiver 205C may be referred to as "angular component of the tag response" (or "non-axial component of the tag response"). The difference between the axial and non-axial components may be determined to generate the tag ID for the tag 203, using one or more detection methods described herein.

Figure 3:
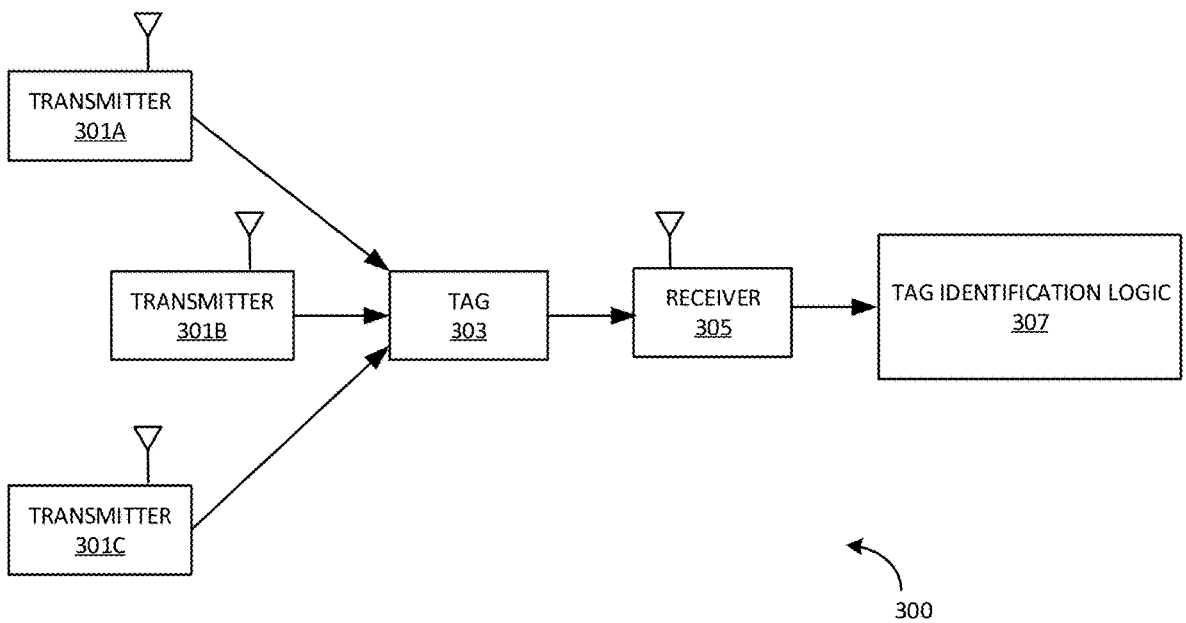
FIG. 3 illustrates a third example system for detecting a passive identification tag for practicing certain aspects of the present disclosure, according to one or more embodiments described herein.

FIG. 3 illustrates an additional example system for detecting a passive identification tag for practicing certain aspects of the present disclosure, in accordance with various implementations. As shown in FIG. 3, the system 300 can include a plurality of transmitters 301 that emit detection signals at different emitting locations, a tag 303 responsive to one or more detection signals generated and emitted by the plurality of transmitters 301, a receiver 305 that receives one or more tag responses generated and transmitted by the tag 303 in response to the one or more detection signals, and a tag identification logic 307 coupled to the receiver 305 to process the one or more tag responses. For example, the plurality of transmitters 301 may include a first transmitter 301A at a first emitting location, a second transmitter 301B at a second emitting location different from the first emitting location, and a third transmitter 301C at a third emitting location different from the first and second emitting locations. The first, second, and third emitting locations may be pre-defined when the first transmitter 301A, the second transmitter 301B, and the third transmitter 301C are hosted in a same device.

In this example, the first transmitter 301A may generate and transmit a first detection signal along a first direction to the tag 303, and the tag 303 may generate and transmit a first tag response in response to the first detection signal. The first direction may be predefined, or be calculated using the first emitting location of the first transmitter 301A and a location of the tag 303, and the first tag response may be received at the receiver 305, or one or more receivers at different locations (not depicted). The second transmitter 301B may generate and transmit a second detection signal along a second direction to the tag 303, and the tag 303 may generate and transmit a second tag response in response to the second detection signal. The second direction may be pre-defined, or be calculated using the second emitting location of the second transmitter 301B and the location of the tag 303, and the second tag response may be received at the receiver 305, or one or more receivers at different locations (not depicted). The third transmitter 301C may generate and transmit a third detection signal along a third direction to the tag 303, and the tag 303 may generate and transmit a third tag response in response to the third detection signal. The third direction may be pre-defined, or be calculated using the third emitting location of the third transmitter 301C and the location of the tag 303, and the third tag response may be received at the receiver 305, or one or more receivers at different locations (not depicted).

Optionally, in the above example, the receiver 305 may be positioned to align with an axis of the tag 303 to receive axial components of the first, second, and third tag responses. Optionally, in the above example, the second transmitter 301B may be positioned at the second emitting location to generate the second detection signal in the second direction that aligns with the axis of the tag 303, so that the second tag response generated by the tag 303 has a maximum signal amplitude. Optionally, in the above example, the receiving system can include additional receivers positioned off the axis of the tag 303 to receive non-axial components of the first, second, and third tag responses. The tag identification logic 307 may provide instructions executable by the processor to process the axial and/or non-axial components of the first, second, and third tag response, to generate a tag ID for the tag 303, where the tag ID can be applied to identify the object/produce to which the tag 303 is attached.

Figure 4:
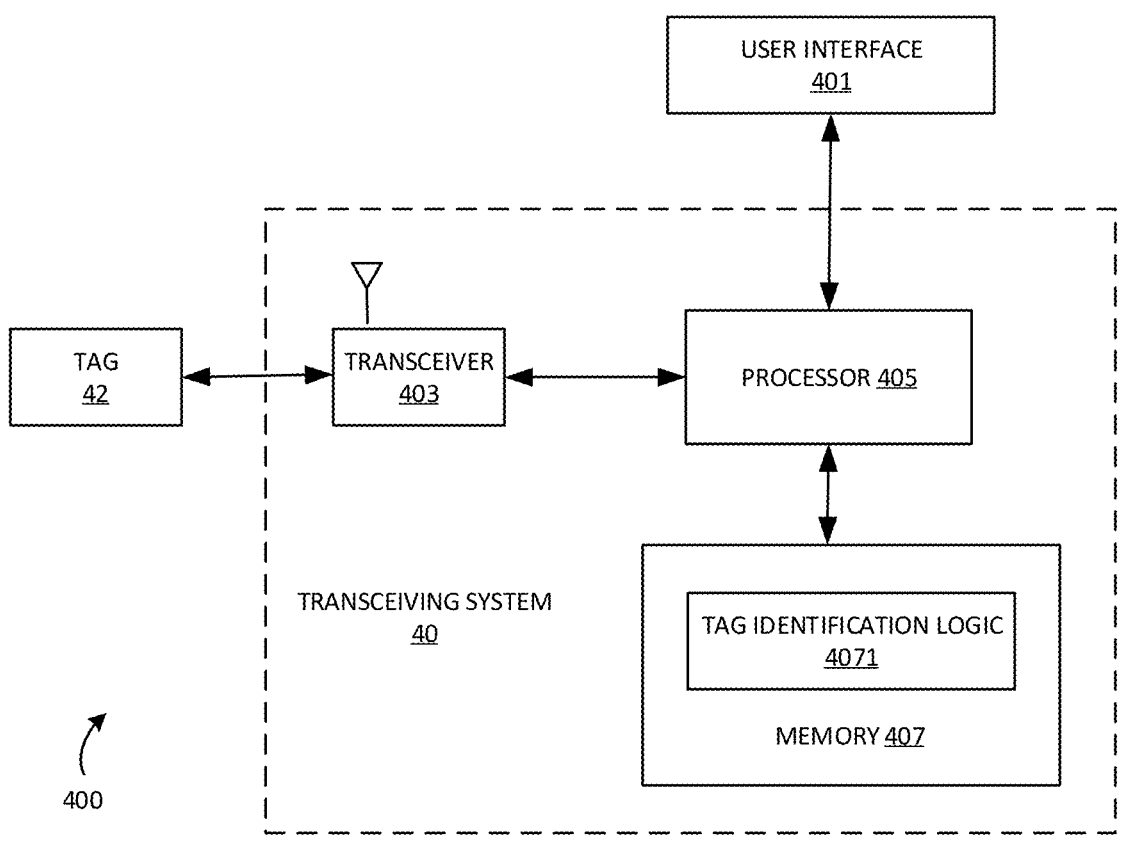
FIG. 4 illustrates a fourth example system for detecting a passive identification tag for practicing certain aspects of the present disclosure, in accordance with various implementations.

FIG. 4 illustrates a further example system for detecting a passive identification tag for practicing certain aspects of the present disclosure, in accordance with various implementations. As shown in FIG. 4, the system 400 can include a transceiving system 40, and a tag 42, where the transceiving system 40 can include a transceiver 403 that transmits a detection signal to the tag 42 and receives a tag response that is in response to the detection signal from the tag 42. The transceiving system 40 can further include a processor 405 that can execute a tag identification logic 4071, a memory 407 that stores the tag identification logic 4071, and a user interface 401 coupled to the processor 405 for interaction with one or more users of the transceiving system 40. Similar and repeated descriptions of the transceiver 403, the tag 42, the processor 405, and/or the memory 407 are omitted herein and can be found throughout this disclosure.

Figure 5A:
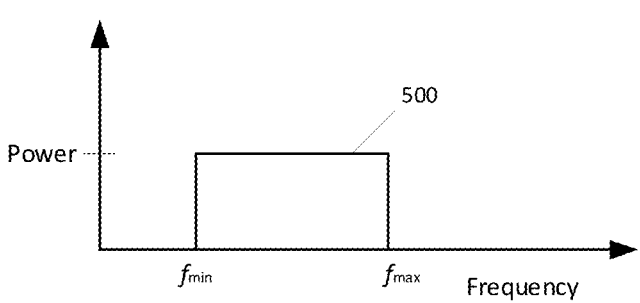
FIG. 5A illustrates an example detection signal for generating a tag response from a passive identification tag, according to one or more embodiments described herein.
Figure 5B:
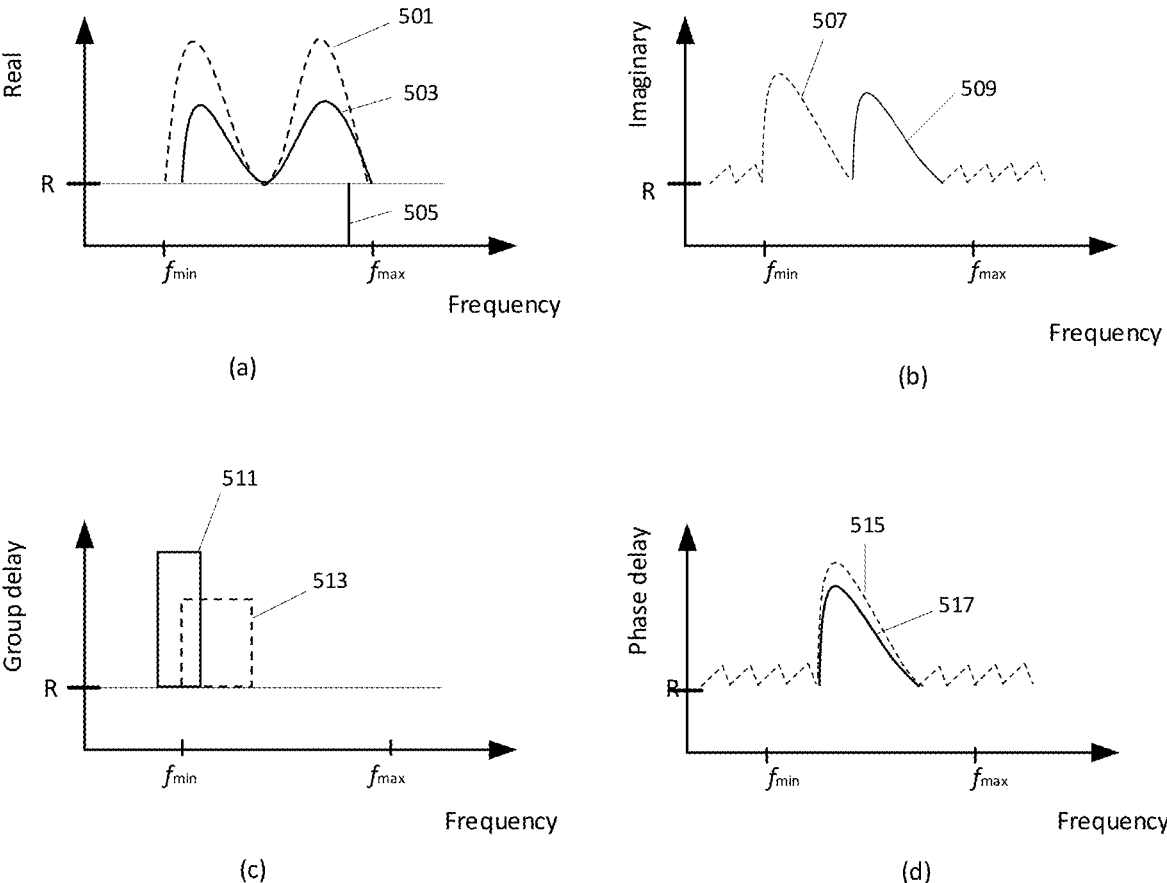
FIG. 5B illustrates example components of a tag response generated by a passive identification tag in response to receiving the detection signal in FIG. 5A, according to one or more embodiments described herein.

FIG. 5A and FIG. 5B together illustrate a principle for generating and processing a tag response from a passive identification tag, in accordance with various implementations. As shown in FIG. 5A, a transmitter or transceiver consistent with various implementations can generate a detection signal 500. The detection signal 500 can be a time-varying signal with its frequency varying as a function of time. For example, the detection signal 500 in FIG. 5A can have an initial frequency $f_{min}$ gradually increased to a final frequency $f_{max}$ over the period of signal detection. Optionally, the detection signal 500 can have its amplitude/power being stabilized (independent of time) to improve, for example, the signal-to-noise level, but this is not required to implement methods or systems described in this disclosure.

Referring to FIG. 5B, after the transmitter or the transceiver generates and transmits the detection signal 500 to a first tag having a resonance layer disposed on a substrate, the first tag can generate a tag response, where the tag response includes one or more signal components whose characteristic values are stored in a multidimensional vector. For example, as shown in FIG. 5B, the tag response generated by the first tag can be processed to include a real amplitude component 501, an imaginary amplitude component 507, a group delay component 513, and a phase delay component 515. For each of the real amplitude component 501, the imaginary amplitude component 507, the group delay component 513, and the phase delay component 515, a characteristic value can be determined and normalized, where the normalized characteristic values are processed to determine a tag ID for the first tag.

The transmitter or the transceiver can generate and transmit the same detection signal 500 to a second tag, where the second tag differs from the first tag by having a dielectric layer disposed over the resonance layer in the first tag to modify the tag response generated by the resonance layer in the first tag. As shown in FIG. 5B, the second tag generates a modified tag response, where the modified tag response is processed to include a modified real amplitude component 503, a modified imaginary amplitude component 509, a modified group delay component 511, and a modified phase delay component 517. For each of the real amplitude component 503, the imaginary amplitude component 509, the group delay component 511, and the phase delay component 517, a characteristic value can be determined and normalized, where the normalized characteristic values are processed to determine a tag ID for the second tag. The tag ID for the first tag is different from the tag ID for the second tag.

In some implementations, the detection signal 500 can be continuous. In other implementations, the detection signal 500 can be discrete. For example, the detection signal 500 may have a first frequency within a range of a 4G signal at moment $t_1$ (not shown, or alternatively within a first time period), and/or a second frequency within a range of a 5G signal at moment $t_2$ (not shown, or alternatively within a second time period). While FIG. 5A illustrates the detection signal 500 to have a fixed power, the power (or other parameters such as frequency range and polarization) of the detection signal 500 may be increased (or adjusted) for more accurate detection. For example, FIG. 6A illustrates the influence of frequency range of a detection signal on a tag response generated by a tag that receives the detection signal, in accordance with various implementations.

Figure 6A:
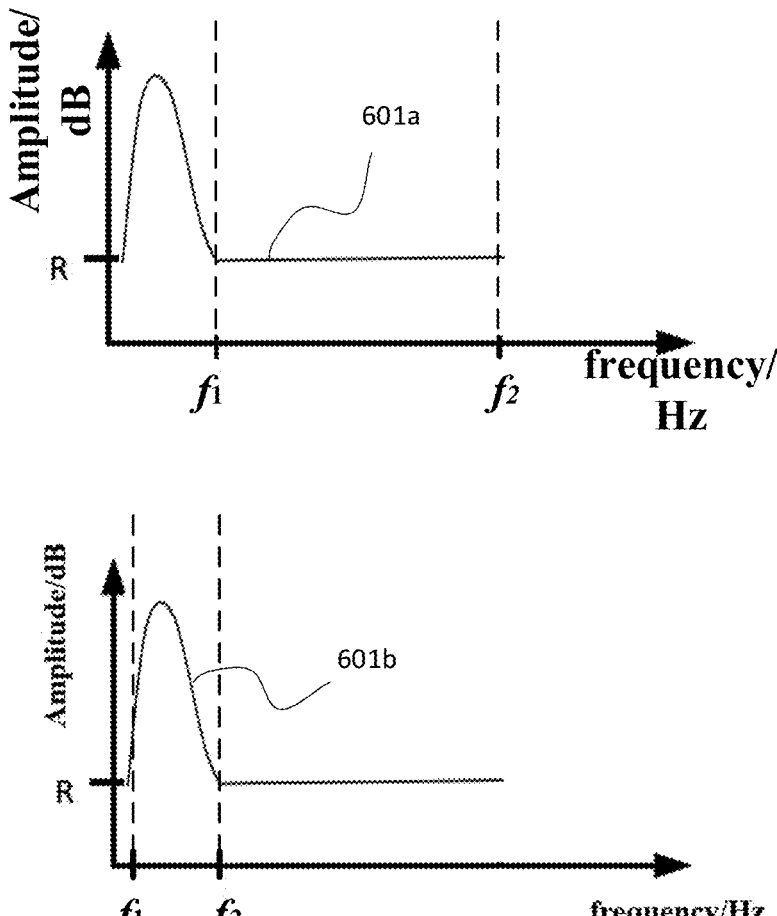
FIG. 6A illustrates the influence of frequency range of a detection signal, that is received by an example tag, on a response signal generated by the example tag, according to one or more embodiments described herein.

As shown in FIG. 6A, when a transmitter transmits an original detection signal having a frequency range of $f_1 \sim f_2$ to interrogate a tag that responds to frequencies lower than $f_1$, the tag may generate no tag response (i.e., an original tag response that is not detectable, see original real amplitude component 601a). In this situation, the transmitter can be programmed or manually switched to the fifth mode in which a higher frequency range is selected to transmit an updated detection signal having an updated frequency range of $f' \sim f''$, where $f''$ is lower than $f_1$, so that the tag correspondingly responds to the updated detection signal by generating an updated tag response that includes an updated real amplitude component 601b (other updated signal components for the updated tag response being omitted for simplified illustration). The updated real amplitude component 601b, along with one or more other updated signal components (not shown), can be processed to generate a multidimensional vector in which characteristic values of the updated real amplitude component 601b and characteristic values of the one or more other updated signal components are stored. The multidimensional vector can be used to generate a tag ID to identify and track the tag.

Figure 6B:
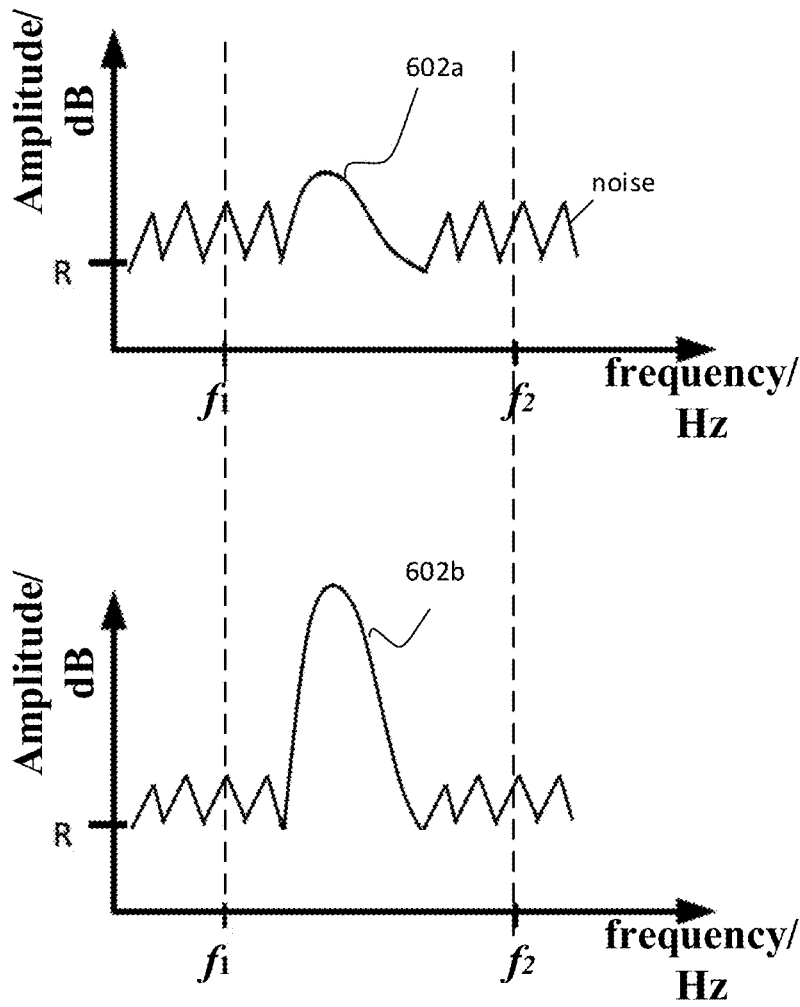
FIG. 6B illustrates the influence of the power of a detection signal, that is received by an example tag, on a response signal generated by the example tag, according to one or more embodiments described herein.

FIG. 6B illustrates the influence of the power of a detection signal on a tag response generated by a tag that receives the detection signal, in accordance with various implementations. As shown in FIG. 6B, when a transmitter transmits an original detection signal having a first power (not shown) to interrogate a tag having a degraded resonant structure, the tag may generate an original tag response that is relatively weak (see the original real amplitude component 602a for the original tag response) and hard to differentiate from the noise. In this situation, the transmitter can be programmed or manually switched to the first mode in which a higher power is selected to transmit an updated detection signal having the higher power, so that the tag responds to the updated detection signal by generating an updated tag response that includes an updated real amplitude component 602b (other updated signal components omitted for simplified illustration). The updated real amplitude component 602b, along with one or more other updated signal components (not shown), can be processed to generate a multidimensional vector in which characteristic values of the updated real amplitude component 602b and characteristic values of the one or more other updated signal components for the updated tag response are stored. The multidimensional vector can be used to generate a tag ID to identify and track the tag.

Figure 6C:
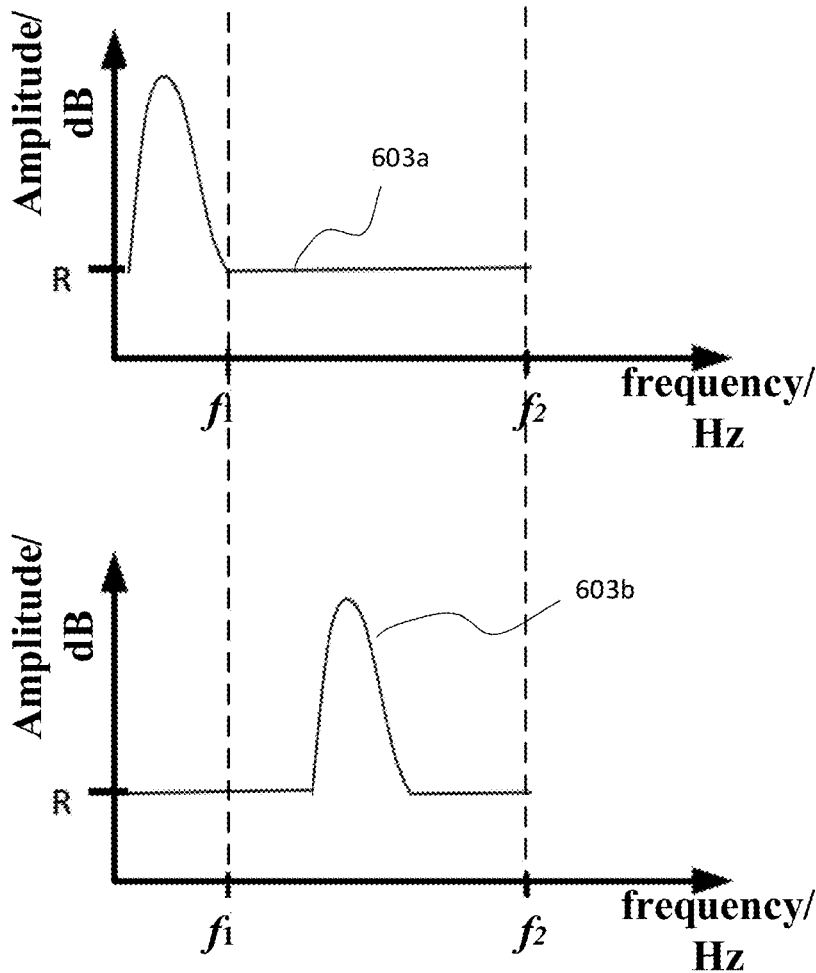
FIG. 6C illustrates the influence of incidence angle of a detection signal, that is received by an example tag, on a response signal generated by the example tag, according to one or more embodiments described herein.

FIG. 6C illustrates the influence of incidence angle of a detection signal on a tag response generated by a tag that receives the detection signal, in accordance with various implementations. As shown in FIG. 6C, a transmitter transmits an original detection signal having a first incidence angle (not shown) and a frequency range of $f_1 \sim f_2$ to interrogate a tag having a particularly orientated resonant structure. The tag may, in response to such original detection signal, generate an original tag response that is undetectable. For example, the original real amplitude component 603a can show no peak within the frequency range of $f_1 \sim f_2$, indicating that the original tag response is undetectable by a receiver. In this situation, the transmitter can be programmed or manually switched to the second mode in which a different incidence angle is selected to transmit an updated detection signal having a second incidence angle (that is different from the first polarization). Correspondingly, the tag responds to the updated detection signal by generating an updated tag response that includes an updated real amplitude component 603b (other signal components omitted for simplified illustration) that is detectable by the receiver. The updated real amplitude component 603b, along with one or more other signal components (not shown) for the updated tag response, can be processed to generate a multidimensional vector in which characteristic values of the real amplitude component 603b and characteristic values of the one or more other signal components for the updated tag response are stored. The multidimensional vector can be used to generate a tag ID to identify and track the tag.

Figure 6D:
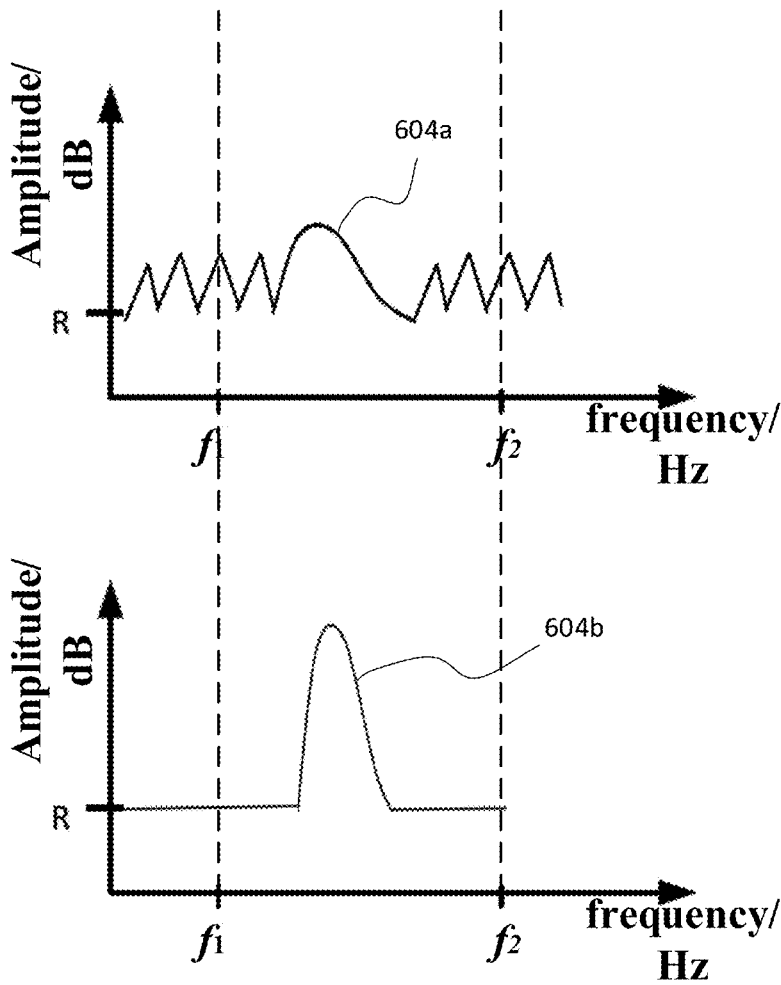
FIG. 6D illustrates the influence of polarization of a detection signal, that is received by an example tag, on a response signal generated by the example tag, according to one or more embodiments described herein.

FIG. 6D illustrates the influence of polarization of a detection signal on a tag response generated by a tag that receives the detection signal, in accordance with various implementations. As shown in FIG. 6D, a transmitter transmits an original detection signal having a first polarization (not shown) and a frequency range of $f_1 \sim f_2$ to interrogate a tag having a particularly orientated resonant structure. The tag may, in response to such original detection signal, generate an original tag response that is weak and hard to differentiate from the noise response. For example, the original real amplitude component 604a for the original tag response can show a weak peak with similar or approximately the same amplitude as the noise, making it difficult to differentiate the original tag response from the noise response. In this situation, the transmitter can be programmed or manually switched to the second mode in which a different polarization is selected to transmit an updated detection signal having a second polarization (that is different from the first polarization). Correspondingly, the tag responds to the updated detection signal by generating an updated tag response that includes an updated real amplitude component 604*b* (other signal components omitted for simplified illustration) that is detectable by the receiver. The updated real amplitude component 604*b*, along with one or more other signal components (not shown) for the updated tag response, can be processed to generate a multidimensional vector in which characteristic values of the real amplitude component 604*b* and characteristic values of the one or more other signal components for the updated tag response are stored. The multidimensional vector can be used to generate a tag ID to identify and track the tag.

Figure 7:
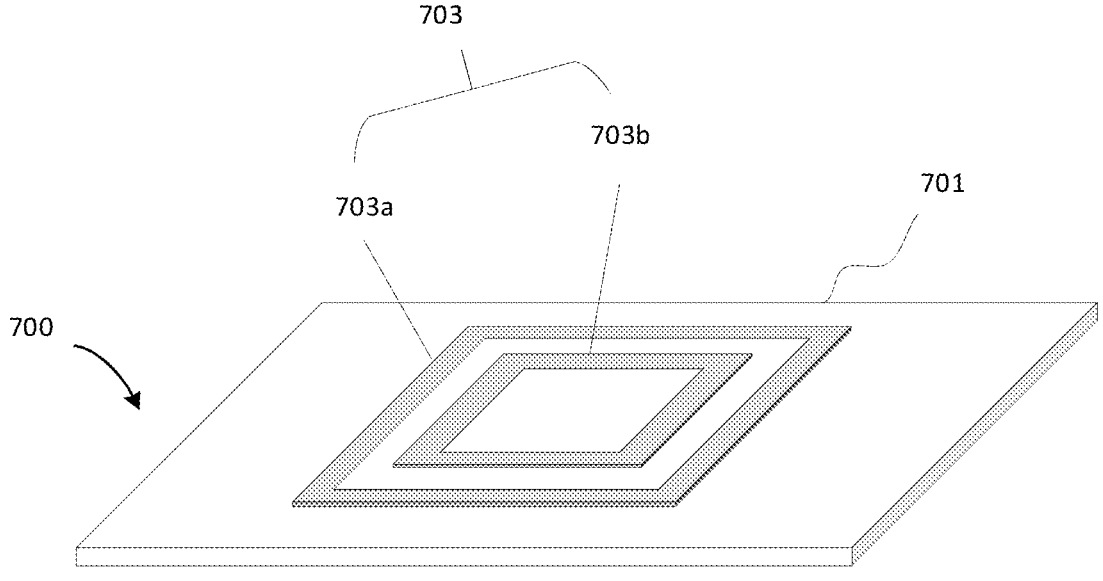
FIG. 7 illustrates an example chipless passive identification tag, according to one or more embodiments described herein.
Figure 9:
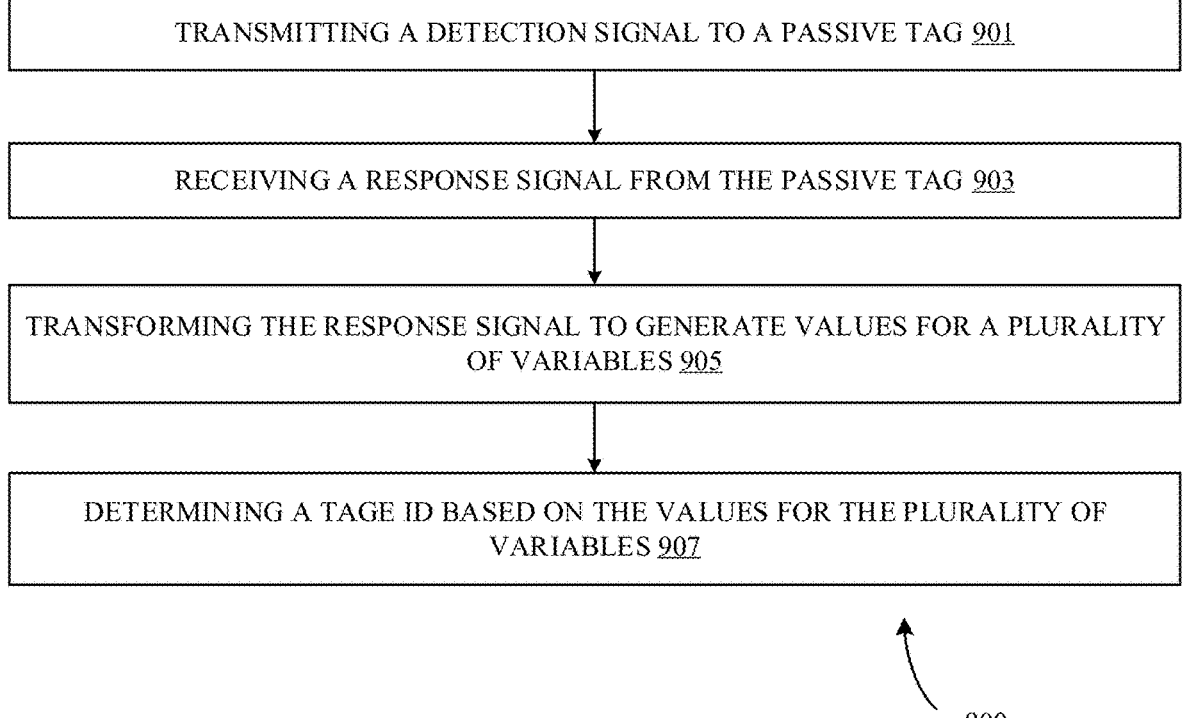
FIG. 9 illustrates an example method for detecting a passive identification tag for practicing certain aspects of the present disclosure, according to one or more embodiments described herein.

In some implementations, the tag can be chipless and have a layered structure. FIG. 7 illustrates a chipless passive identification tag, detectable by one or more example detection methods or systems, in accordance with various implementations provided herein. As shown in FIG. 7, a chipless passive identification tag 700 includes a substrate 701 and a resonant structure 703 disposed over the substrate 701. The resonant structure 703 can be a frequency-selective surface (FSS) that includes a first square loop 703*a* and a second square loop 703*b* disposed concentrically. However, the FSS surface in the chipless passive identification tag 700 is not limited thereto, and can be customized based on specific needs of users. For example, based on the user's needs, the material and geometrical dimensions of the FSS surface can be modified so that the resonance frequency of the chipless passive identification tag 700 is modified. Because no chip or antenna is included and the resonant structure can be fully printable, the size and cost of the chipless passive identification tag 700 is considerably reduced, while still maintaining a desired or improved encoding capacity, with respect to the existing passive identification tag. FIG. 9 illustrates an example method 900 for detecting a tag (e.g., a passive identification tag) for practicing certain aspects of the present disclosure, in accordance with various implementations. As shown in FIG. 9, the method 900 includes: at block 901, transmitting a detection signal to a tag (e.g., passive identification tag). The detection signal can be a continuous signal or a discrete signal, each showing varied frequencies at different points of time. The detection signal can be generated and transmitted to the tag via a transmitter or a transceiver, and in some implementations, a plurality of transmitters at different locations may be configured to generate and transmit a plurality of detection signals to the tag to generate a plurality of corresponding tag responses. In some implementations, one of the plurality of transmitters may be positioned to align with a particular axis of the tag for the tag to generate a tag response with a maximum amplitude. The tag can have a layered structure including, for example, a substrate and a FSS layer printed on the substrate. Optionally, the tag can further include a dielectric layer printed on the FSS layer to modify the tag response(s) generated by the tag in response to the detection signal(s); however, the layered structure of the tag is not limited thereto.

The method 900 can further include: at block 903, receiving a response signal ("tag response") from the tag. The response signal can be continuous or discrete, depending on the detection signal. In some implementations, the response signal can be received by a receiver (or the transceiver), for example, at a location aligned with an axis of the tag. In some implementations, the response signal can be received by a plurality of receivers at different locations with respect to the tag, so that both axial and non-axial components of the response signal are detected to determine a tag identification (ID) for the tag. In some implementations, depending on the parameters of the detection signal, the response signal can be processed to determine one or more signal components for storage in a multidimensional vector, where the one or more signal components can include a real amplitude component, an imaginary amplitude component, a group delay component, and a phase delay component. Repeated descriptions are not provided herein.

The method 900 can further include: at block 905, transforming the response signal to generate values (e.g., characteristic values) for a plurality of variables (e.g., the one or more signal components) of the response signal. For example, the response signal can be processed by the aforementioned processor, under instructions from the tag identification logic, to determine values for the one or more signal components including: the real amplitude component, the imaginary amplitude component, the group delay component, and the phase delay component. Optionally, the processor or the tag identification logic may further process the one or more signal components to remove noise from the one or more signal components, thereby determining adjusted values for the one or more signal components. Optionally, the adjusted values for the one or more signal components may be normalized before further processing that results in a tag ID for the tag.

The method 900 can further include: at block 907, determining a tag ID based on the values for the plurality of variables. For example, the tag ID may be computed using the values for the aforementioned one or more signal components, using the adjusted values of the aforementioned one or more signal components, or using the normalized values of the aforementioned one or more signal components. For example, a numeric value may be obtained for each of the one or more signal components, and the numeric values may have a sum, which is applied to a hash function to determine the tag ID. In another example, the numeric values may be processed using a computational algorithm different from addition to generate a final value, as input to the hash function to determine the tag ID. The tag ID can be applied to identify an object or product to which the tag is attached, and other information about the object or product may then be stored/updated in association with the tag ID in a database or a ledger.

Figure 8:
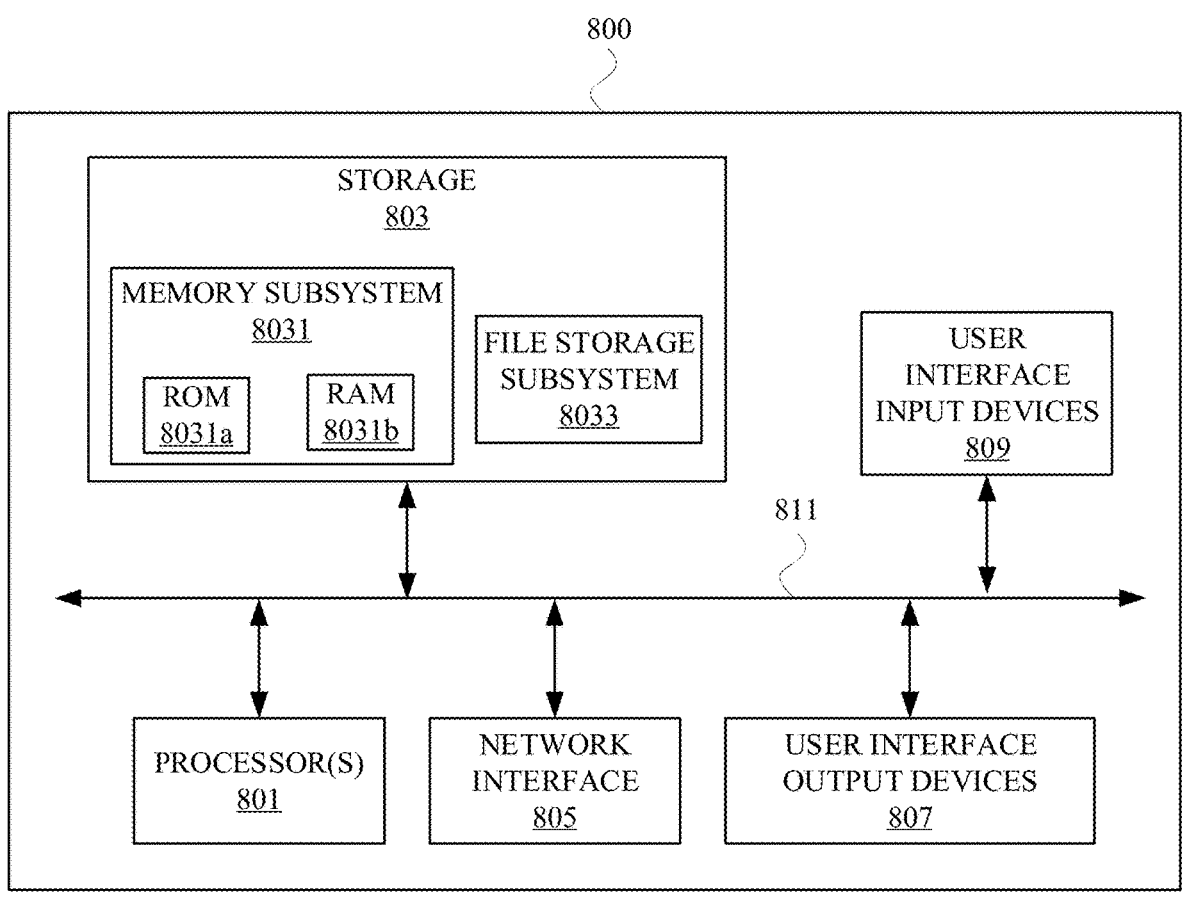
FIG. 8 illustrates an example architecture of a computing device, for practicing certain aspects of the present disclosure, according to one or more embodiments described herein.

FIG. 8 illustrates an example architecture of a computing device 800, for practicing certain aspects of the present disclosure, in accordance with various implementations. In some implementations, one or more of the transmitting system, receiving system, and transceiving system may comprise one or more signal components of the example computing device 800.

Computing device 800 can include at least one processor 801 which communicates with a number of peripheral devices via bus subsystem 811. These peripheral devices may include a storage 803, including, for example, a memory subsystem 8031 and a file storage subsystem 8033 that stores one or more tag IDs, user interface input devices 809, user interface output devices 809, and a network interface subsystem 805. The input and output devices allow user interaction with computing device 800. Network interface subsystem 805 provides an interface to outside networks and is coupled to corresponding interface devices in other computing devices.

User interface input devices 809 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 800 or onto a communication network.

User interface output devices 807 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 800 to the user or to another machine or computing device.

Storage 803 stores programming and data constructs that provide the functionality of some or all of the modules described herein. For example, the storage 803 may include the logic (e.g., the aforementioned tag identification logic) to perform selected aspects of one or more of the methods described herein, and/or to implement various components depicted herein.

These software modules are generally executed by processor 801 alone or in combination with other processors. Memory subsystem 8031 used in the storage 803 can include a number of memories including a read only memory ("ROM") 8031*a* in which fixed instructions are stored, and a main random access memory ("RAM") 8031*b* for storage of instructions and data during program execution. The file storage subsystem 8033 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 8033 in the storage 803, or in other machines accessible by the processor(s) 801.

Bus subsystem 811 provides a mechanism for letting the various components and subsystems of computing device 800 communicate with each other as intended. Although bus subsystem 811 is shown schematically as a single bus, alternative implementations of the bus subsystem may use multiple buses.

Computing device 800 can be of varying types including a workstation, server, computing cluster, blade server, server farm, or any other data processing system or computing device. Due to the ever-changing nature of computers and networks, the description of computing device 800 depicted in FIG. 8 is intended only as a specific example for purposes of illustrating some implementations. Many other configurations of computing device 800 are possible having more or fewer components than the computing device depicted in FIG. 8.

Some implementations of the computing device 800 may include a system having one or more user devices, each with one or more processors and memory operably coupled with the one or more processors, where the memory(ies) of the one or more user devices store instructions that, in response to execution of the instructions by the one or more processors of the one or more user devices, cause the one or more processors to perform any of the methods described herein. Some implementations also include at least one non-transitory computer-readable medium including instructions that, in response to execution of the instructions by one or more processors, cause the one or more processors to perform any of the methods described herein.

The present disclosure has been described in particular detail with respect to possible implementations or embodiments. Those of skill in the art will appreciate that the disclosure may be practiced in other implementations. First, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements, or entirely in software elements. Also, the particular division of functionality between the various system components described herein is merely exemplary. Functions performed by a single system component may instead be performed by multiple components, and functions performed by multiple components may instead be performed by a single component. In various implementations, the present disclosure can be practiced as a system or a method for performing the above-described techniques, either singly or in any combination. The appearances of the phrase "in some implementations" in various paragraphs of the specification are not necessarily all referring to the same implementations.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "process" or "compute" or "calculate" or "determine" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure can be embodied in software, firmware and/or hardware, and when embodied in software, can be downloaded to reside on and be operated from different platforms used by a variety of operating systems.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present disclosure is not described with reference to any particular programming language. It will be appreciated that a variety of programming languages may be used to implement the teachings of the present disclosure as described herein, and any references above to specific languages are provided for disclosure of enablement and best mode of the present disclosure.

While the disclosure has been described with respect to a limited number of implementations, those skilled in the art, having benefit of the above description, will appreciate that other implementations may be devised which do not depart from the scope of the present disclosure as described herein. In addition, it should be noted that the language used in the specification has been principally selected for readability and instructional purposes, and may not have been selected to delineate or circumscribe the inventive subject matter. Accordingly, the descriptions of the present disclosure are intended to be illustrative, but not limiting, of the scope of the disclosure, which is set forth in the claims.

We claim:

1. A system comprising:
   a transmitter configured to transmit a set of interrogation signals over a frequency range to interrogate a set of identification tags, the set of interrogation signals comprising a first interrogation signal within a first frequency subrange in the frequency range; and
   a receiver configured to:
      receive a first tag response, the first tag response:
         generated by a first identification tag, in the set of identification tags, responsive to receiving the first interrogation signal; and
         modulated by the first identification tag over the first frequency subrange;
      detect a first set of signal components of the first tag response; and
      derive a first tag identifier of the first identification tag based on the first set of signal components.

2. The system of claim 1, further comprising the first identification tag comprising:
   a resonance layer configured to generate a resonance signal responsive to receiving the first interrogation signal; and
   a dielectric layer:
      comprising a dielectric structure arranged over the resonance layer; and
      configured to modulate the resonance signal, generated by the resonance layer, over the first frequency subrange to generate the first tag response.

3. The system of claim 1, further comprising the first identification tag comprising:
   a resonance layer configured to generate a resonance signal responsive to receiving the first interrogation signal; and
   a dielectric layer:
      comprising a conductive structure arranged over the resonance layer; and
      configured to modulate the resonance signal, generated by the resonance layer, over the first frequency subrange to generate the first tag response.

4. The system of claim 1, further comprising the first identification tag comprising:
   a resonance layer configured to generate a resonance signal responsive to receiving the first interrogation signal; and
   a dielectric layer:
      comprising a hybrid-dielectric structure arranged over the resonance layer; and
      configured to modulate the resonance signal, generated by the resonance layer, over the first frequency subrange to generate the first tag response.

5. The system of claim 1:
   further comprising a housing; and
   wherein the transmitter and the receiver are arranged in the housing.

6. The system of claim 1, wherein the receiver is configured to:
   detect the first set of signal components, of the first tag response, comprising:
      a set of vector elements comprising a real component of the first tag response and an imaginary component of the first tag response; and
   derive the first tag identifier by:
      deriving a set of scalar elements of the first tag response, the set of scalar elements comprising a magnitude component, a phase component, a group delay component, and a phase delay component based on the real component of the first tag response and the imaginary component of the first tag response;
      accessing a function relating signal components of tag responses to characteristic values representing unique characteristics of tag responses;
      deriving a first set of characteristic values for the first tag response based on the magnitude component, the phase component, the group delay component, the phase delay component, and the function; and
      transforming the first set of characteristic values into the first tag identifier according to a tag identification model.

7. The system of claim 1, wherein the receiver is configured to:
   detect the first set of signal components, of the first tag response, comprising a magnitude component, a phase component, a group delay component, and a phase delay component; and
   derive the first tag identifier by:
      accessing a function relating signal components of tag responses to characteristic values representing unique characteristics of tag responses; and
      deriving a first set of characteristic values for the first tag response based on the magnitude component, the phase component, the group delay component, the phase delay component, and the function; and
      transforming the first set of characteristic values into the first tag identifier according to a tag identification model.

8. The system of claim 1:
   wherein the transmitter is configured to transmit the set of interrogation signals further comprising a second interrogation signal within a second frequency subrange in the frequency range; and
   wherein the receiver is configured to:
      receive a second tag response, the second tag response:
         generated by the first identification tag responsive to the first identification tag receiving the second interrogation signal; and modulated by the first identification tag over the second frequency subrange;

detect a second set of signal components of the second tag response, the second set of signal components different from the first set of signal components; and derive the first tag identifier of the first identification tag based on the first set of signal components and the second set of signal components.

9. The system of claim 1, wherein the receiver is further configured to:

receive a second tag response:

generated by a second identification tag in the set of identification tags, responsive to the second identification tag receiving the first interrogation signal; and modulated by the second identification tag over the first frequency subrange;

detect a second set of signal components of the second tag response; and derive a second tag identifier of the second identification tag, different from the first tag identifier, based on the second set of signal components.

10. A system comprising:

a transceiving system configured to:

transmit a set of interrogation signals over a frequency range to interrogate identification tags, the set of interrogation signals comprising:

a first interrogation signal within a first frequency subrange in the frequency range and configured to interrogate identification tags at a first incident angle; and a second interrogation signal within the first frequency subrange and configured to interrogate identification tags at a second incident angle different from the first incident angle;

receive a first tag response, the first tag response:

generated by a first identification tag responsive to the first identification tag receiving the first interrogation signal; and modulated by the first identification tag over the first frequency subrange;

receive a second tag response, the second tag response:

generated by the first identification tag responsive to the first identification tag receiving the second interrogation signal; and modulated by the first identification tag over the first frequency subrange;

detect a first set of signal components of the first tag response and a second set of signal components of the second tag response; and derive a first tag identifier of the first identification tag based on the first set of signal components and the second set of signal components.

11. The system of claim 10, further comprising the first identification tag comprising:

a resonance layer configured to:

generate a first resonance signal responsive to receiving the first interrogation signal; and generate a second resonance signal responsive to receiving the first interrogation signal; and a dielectric layer:

comprising a dielectric structure arranged over the resonance layer;

configured to modulate the first resonance signal, generated by the resonance layer, over the first frequency subrange to generate the first tag response; and configured to modulate the second resonance signal, generated by the resonance layer, over the first frequency subrange to generate the second tag response.

12. The system of claim 10, further comprising the first identification tag comprising:

a resonance layer configured to:

generate a first resonance signal responsive to receiving the first interrogation signal; and generate a second resonance signal responsive to receiving the first interrogation signal; and a dielectric layer:

comprising a conductive structure arranged over the resonance layer;

configured to modulate the first resonance signal, generated by the resonance layer, over the first frequency subrange to generate the first tag response; and configured to modulate the second resonance signal, generated by the resonance layer, over the first frequency subrange to generate the second tag response.

13. The system of claim 10, further comprising the first identification tag comprising:

a resonance layer configured to:

generate a first resonance signal responsive to receiving the first interrogation signal; and generate a second resonance signal responsive to receiving the first interrogation signal; and a dielectric layer:

comprising a hybrid-dielectric structure arranged over the resonance layer;

configured to modulate the first resonance signal, generated by the resonance layer, over the first frequency subrange to generate the first tag response; and configured to modulate the second resonance signal, generated by the resonance layer, over the first frequency subrange to generate the second tag response.

14. The system of claim 10, wherein the transceiving system comprises:

a first transceiver arranged at a first location coaxial with an axis of the first identification tag and configured to:

broadcast the first interrogation signal to interrogate identification tags at the first incident angle; and receive an axial component of the first tag response generated by the first identification tag responsive to the first identification tag receiving the first interrogation signal; and a second transceiver arranged at a second location non-coaxial with the first identification tag and configured to:

broadcast the second interrogation signal to interrogate identification tags at the second incident angle different from the first incident angle; and receive a non-axial component of the second tag response generated by the first identification tag responsive to the first identification tag receiving the second interrogation signal.

15. The system of claim 14, wherein the transceiving system is configured to derive the first tag identifier by:

detecting a difference between the axial component and the non-axial component of the first tag response;

accessing a function relating signal components of tag responses to characteristic values representing unique characteristics of tag responses;

deriving a first set of characteristic values for the first tag response based on the difference and the function; and transforming the first set of characteristic values into the first tag identifier according to a tag identification model.

16. The system of claim 10, wherein the transceiving system is configured to derive the first tag identifier by:

detecting the first set of signal components, of the first tag response, comprising real and imaginary components comprising a first magnitude component, a first phase component, a first group delay component, and a first phase delay component;

detecting the second set of signal components, of the second tag response, comprising real and imaginary components, comprising a second magnitude component, a second phase component, a second group delay component, and a second phase delay component;

accessing a function relating signal components of tag responses to characteristic values representing unique characteristics of tag responses;

deriving a first set of characteristic values for the first tag response based on the first and second magnitude components, the first and second phase components, the first and second group delay components, the first and second phase delay components, and the function; and transforming the first set of characteristic values into the first tag identifier according to a tag identification model.

17. The system of claim 10, wherein the transceiving system comprises:

a housing;

a first transceiver arranged in the housing and configured to:

broadcast the first interrogation signal to interrogate identification tags at the first incident angle; and receive the first tag response generated by the first identification tag responsive to the first identification tag receiving the first interrogation signal; and a second transceiver arranged in the housing and configured to:

broadcast the second interrogation signal to interrogate identification tags at the second incident angle; and receive the second tag response generated by the first identification tag responsive to the first identification tag receiving the second interrogation signal.

18. The system of claim 10, wherein the transceiving system is further configured to:

receive a tag response, generated by a second identification tag, responsive to the second identification tag receiving the first interrogation signal; and responsive to failure to detect a second set of signal components of the tag response:

generate a modified interrogation signal by perturbing a magnitude of the first interrogation signal;

transmit the modified interrogation signal to interrogate the second identification tag at the first incident angle;

receive a third tag response, the third tag response:

generated by the second identification tag responsive to the second identification tag receiving the modified interrogation signal; and modulated by the second identification tag;

detect a third set of signal characteristics of the third tag response; and derive a third tag identifier of the second identification tag based on the third set of signal characteristics.

19. A system comprising:

a transceiver configured to:

broadcast an interrogation signal over a frequency range to interrogate identification tags;

receive a tag response:

generated by an identification tag responsive to the identification tag receiving the interrogation signal; and modulated by first identification tag within the frequency range;

detect a set of signal components of the tag response; and derive a tag identifier of the identification tag based on the set of signal components.

20. The system of claim 19, further comprising the identification tag comprising:

a resonance layer configured to generate a resonance signal responsive to receiving the interrogation signal; and a dielectric layer configured to modulate the resonance signal, generated by the resonance layer, over the frequency range to generate the tag response.

* * * * *